No. 896,163. PATENTED AUG. 18, 1908.
C. SCHMIDT.
FLEXIBLE JOINT FOR PIPING.
APPLICATION FILED FEB. 27, 1906.
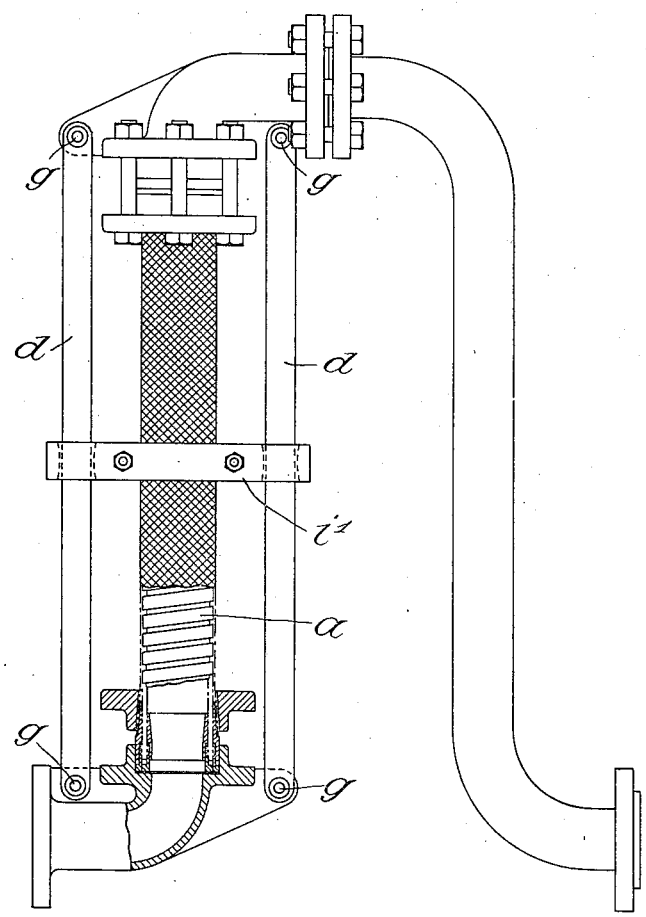
Witnesses:-
Isaac Stone
Clarina Franck
Inventor:-
Carl Schmidt
by O. A. Schmidt
his attorney

UNITED STATES PATENT OFFICE.

CARL SCHMIDT, OF DRESDEN-RÄCKNITZ, GERMANY.

FLEXIBLE JOINT FOR PIPING.

No. 896,163.  Specification of Letters Patent.  Patented Aug. 18, 1908.

Application filed February 27, 1906. Serial No. 303,165.

*To all whom it may concern:*

Be it known that I, CARL SCHMIDT, a subject of the King of Saxony, residing at No. 74 Bergstrasse, Dresden-Räcknitz, Germany, have invented new and useful Improvements in Flexible Joints for Piping, of which the following is a specification.

My invention relates to improvements in flexible joints for piping, by means of which contractions and extensions of the latter are compensated for.

The device consists of a piece of pipe connected in the length of piping in well-known manner and capable of bending to a certain extent and whose axis lies at an angle to that of the piping, so that the flexibility of the pipe can be utilized to compensate for alterations in the length of the piping.

The essential feature of the invention consists in the provision of pivotally secured, rigid bars connecting the terminal flanges of the pipe-sections to be united, and in the employment of a clamp which tightly embraces the flexible pipe and in which the bars are slidable, in such manner that on shifting of the flexible pipe when acting as compensator, its flanges always remain parallel with each other and the bending of the flexible pipe occurs substantially at the central portion thereof.

One form of the invention is illustrated in the accompanying drawing, in which the figure is a part sectional view.

$d\ d$ are the rigid bars, pivotally connected at $g\ q$.

$i^1$ is a clamp which tightly embraces the metallic hose $a$, the bars $d$ being slidable in the clamp, When in compensating for alteration in length of the piping the hose shifts, the terminal flanges still always remain parallel with each other: in other words, the said flanges in conjunction with the bars $d\ d$ always form a parallelogram. The clamp $i^1$ prevents bending of the hose under pressure; and it also causes the bending on alteration of the length of the piping to take place substantially at the center, which bending strain is the most favorable. It will be understood that while the hose $a$ is flexible it has considerable rigidity, and when the bars $d$ are swung on their pivots $g$, the ends of the hose $a$ will remain substantially unflexed but the clamp $i^1$ which embraces the hose will bend the latter at its middle portion.

The new device is naturally equally applicable for all kinds of piping, for example for pipe bends of Z, U or S form, etc.

Having thus described my invention, what I claim as new and desire to secure by Letters Patent is:—

1. In combination, two sections of piping, a flexible pipe secured to the ends thereof, rigid members jointed to the piping-sections parallel with the flexible pipe, and means tightly embracing the flexible pipe and loosely connecting the latter and the rigid members medially of the same, substantially as described.

2. In combination, two flanged sections of piping, a flanged flexible pipe secured to the piping-flanges, rigid bars pivoted to the ends of the piping-sections parallel with the flexible pipe, and a clamp tightly embracing the latter and having a sliding connection with the said bars medially of the same, substantially as described.

3. In combination, two flanged sections of piping, a flanged section of flexible pipe interposed between, and connected to, the same, a pair of rigid parallel bars pivotally connected to the said sections of piping, and a clamp tightly embracing the flexible pipe section at substantially its median portion and slidingly embracing the parallel bars whereby the said clamp has comparatively slight relative movement to the bars and causes the flexible pipe section to bend uniformly at its central part.

In witness whereof I have hereunto signed my name this 12th day of February 1906, in the presence of two subscribing witnesses.

CARL SCHMIDT.

Witnesses:
 PAUL ARRAS,
 PAUL E. SCHILLING.